(12) United States Patent
Tanaka

(10) Patent No.: US 10,324,364 B2
(45) Date of Patent: Jun. 18, 2019

(54) LENS APPARATUS AND IMAGE PROJECTION APPARATUS

(71) Applicant: CANON KABUSHIKI KAISHA, Tokyo (JP)

(72) Inventor: Junichi Tanaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/646,420

(22) Filed: Jul. 11, 2017

(65) Prior Publication Data

US 2017/0307966 A1    Oct. 26, 2017

Related U.S. Application Data

(63) Continuation of application No. PCT/JP2016/000385, filed on Jan. 27, 2016.

(30) Foreign Application Priority Data

Jan. 29, 2015  (JP) ................................. 2015-015283

(51) Int. Cl.
| | | |
|---|---|---|
| *G02B 15/14* | (2006.01) | |
| *G03B 21/14* | (2006.01) | |
| *G02B 7/08* | (2006.01) | |
| *G02B 13/16* | (2006.01) | |
| *G03B 21/00* | (2006.01) | |
| *G02B 7/09* | (2006.01) | |
| *G02B 15/20* | (2006.01) | |

(52) U.S. Cl.
CPC ............. *G03B 21/142* (2013.01); *G02B 7/08* (2013.01); *G02B 7/09* (2013.01); *G02B 13/16* (2013.01);
(Continued)

(58) Field of Classification Search
CPC ........ G03B 21/142; G03B 5/02; G03B 21/00; G03B 21/14; G03B 21/53; G02B 7/08; G02B 7/09; G02B 13/16; G02B 15/20
(Continued)

(56) References Cited

U.S. PATENT DOCUMENTS 3,475,086 A  * 10/1969 Vetter ...................... G02B 1/00
                                                              352/69
9,033,520 B2   5/2015 Maruyama
(Continued)

FOREIGN PATENT DOCUMENTS

| EP | 3229055 A1 | 10/2017 |
|---|---|---|
| JP | 2007121770 A | 5/2007 |

(Continued)

OTHER PUBLICATIONS

Extended European Search Report issued in European Appln. No. 16742983.6 dated Apr. 30, 2018.
(Continued)

*Primary Examiner* — James R Greece
(74) *Attorney, Agent, or Firm* — Rossi, Kimms & McDowell LLP

(57) ABSTRACT

The lens apparatus includes: a first optical unit (FOU) changes a field curvature amount of a projection optical system (POS) by shifting in an optical axis direction (OAD) of POS, a second optical unit (SOU) including a focus adjustment unit moves during focusing and a zoom adjustment unit moves during zooming, the SOU changing projection magnification and focus position of POS by shifting in OAD of POS, a first detection unit (FDU) detecting a position of FOU, a memory stores change information regarding changes in projection magnification and focus position of POS through shift of FOU and a control unit controls SOU to shift so as to reduce changes in projection magnification and focus position of POS at the same time caused due to shift of FOU, when field curvature amount of POS is changed, based on position of FOU detected by FDU and change information stored in memory.

16 Claims, 5 Drawing Sheets

(51) Int. Cl.
  *G03B 5/02* (2006.01)
  *G03B 21/53* (2006.01)
  *G02B 5/30* (2006.01)
  *G02B 27/28* (2006.01)
  *G03B 33/12* (2006.01)

(52) U.S. Cl.
  CPC .............. *G02B 15/20* (2013.01); *G03B 5/02* (2013.01); *G03B 21/00* (2013.01); *G03B 21/14* (2013.01); *G03B 21/53* (2013.01); *G02B 5/3083* (2013.01); *G02B 27/285* (2013.01); *G03B 33/12* (2013.01); *G03B 2205/0046* (2013.01)

(58) Field of Classification Search
  USPC .......................................................... 359/684
  See application file for complete search history.

(56) References Cited

U.S. PATENT DOCUMENTS

| | | |
|---|---|---|
| 2009/0005961 A1 | 1/2009 | Grabowski et al. |
| 2014/0355127 A1 | 12/2014 | Nagahara |

FOREIGN PATENT DOCUMENTS

| | | |
|---|---|---|
| JP | 2011145580 A | 7/2011 |
| JP | 2012093553 A | 5/2012 |
| JP | 2012194226 A | 10/2012 |
| JP | 2013109186 A | 6/2013 |
| JP | 2015230320 A | 12/2015 |

OTHER PUBLICATIONS

International Search Report issued in Intl. Appln. No. PCT/JP2016/000385 dated May 10, 2016. English translation provided.
Written Opinion issued in Intl. Appln. No. PCT/JP2016/000385 dated May 10, 2016.
International Preliminary Report on Patentability issued in Intl. Appln. No. PCT/JP2016/000385 dated Aug. 10, 2017, and English translation of Written Opinion issued in Intl. Appln. No. PCT/JP2016/000385 dated May 10, 2016 (Written Opinion was previously cited in IDS filed Jul. 11, 2017).
Office Action issued in Chinese Appin. No. 201680007052.9 dated Jan. 11, 2019. English Translation provided.

* cited by examiner

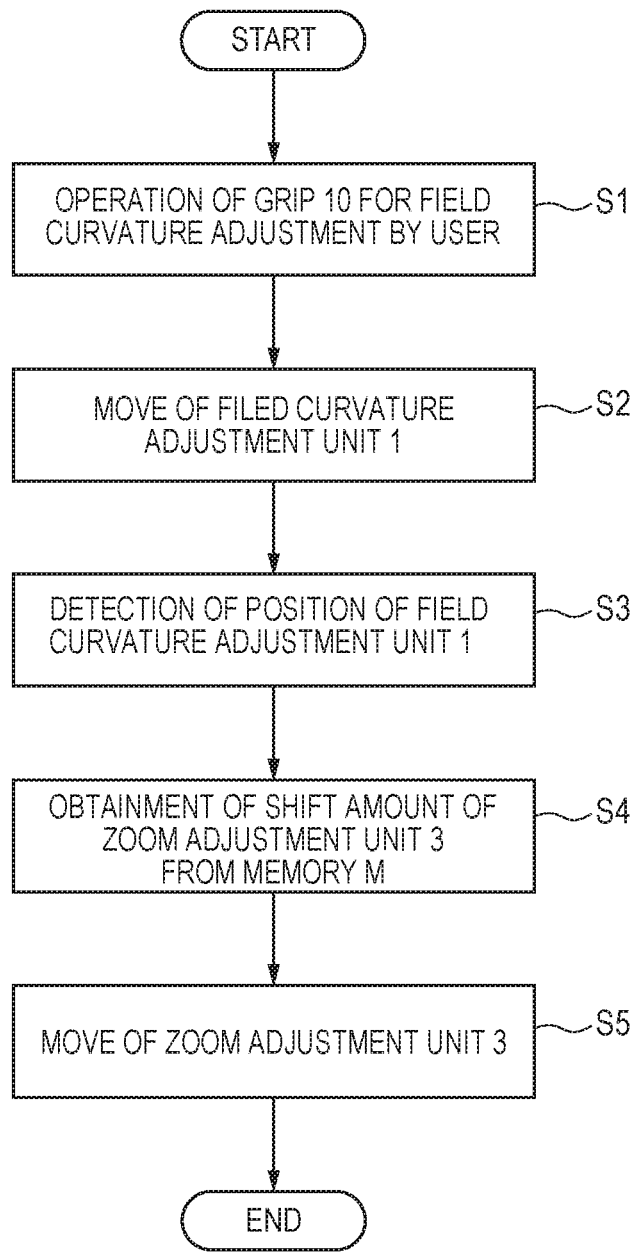

LENS APPARATUS AND IMAGE PROJECTION APPARATUS

CROSS-REFERENCE TO RELATED APPLICATIONS

This application is a Continuation of International Patent Application No. PCT/JP2016/000385, filed Jan. 27, 2016, which claims the benefit of Japanese Patent Application No. 2015-015283, filed Jan. 29, 2015, both of which are hereby incorporated by reference herein in their entirety.

BACKGROUND OF THE INVENTION

Field of the Invention

The present invention relates to a lens apparatus and an image projection apparatus, and more particularly, to an adjustment of a field curvature.

Description of the Related Art

An image projection apparatus projects an image on a spherical screen in some cases. In this case, as viewed from the image projection apparatus, a near side and a far side of the spherical screen exceed an allowable depth of a projection optical system. Thus, both the sides do not come into focus at the same time in some cases.

In order to solve the problem, there is known a product (image projection apparatus) including means for intentionally generating a field curvature along the spherical screen. When the field curvature of a projected image is varied, optical components, which are provided in the projection optical system and have refractive indexes, need to be moved. Then, a focus position and projection magnification are varied. Therefore, in order to obtain a desired optical performance in an entire region of the spherical screen, a zoom measurement, a focus measurement, and a field curvature measurement need to be repeated after the zoom adjustment, the focus adjustment, and the field curvature adjustment are sequentially performed. The series of adjustments and measurements is troublesome.

Further, in the spherical screen, it is significantly difficult to measure optimal focus positions at a plurality of positions (focus measurement), and the measurement is troublesome. Therefore, a method for solving the problem has been demanded.

In Japanese Patent Application Laid-Open No. 2007-121770, there is disclosed that a lens apparatus, which is configured to move a correction lens configured to correct the field curvature through use of a piezoelectric element sheet, corrects the field curvature in accordance with a signal obtained by photoelectrically converting a chart image shot by image pickup means. Specifically, an obtained signal is divided into a plurality of regions, and a focus state is calculated in each of the divided regions, that is, a center and four corners of the screen. A movement direction and a movement amount of the correction lens are determined based on the calculation result.

SUMMARY OF THE INVENTION

However, when the related art disclosed in Japanese Patent Application Laid-Open No. 2007-121770 is applied to the image projection apparatus, which intentionally generates the field curvature along the spherical screen, each of the adjustments and the measurements described above needs to be repeated. Such repeated adjustments and measurements are troublesome, and involve technical difficulty in practice.

It is an object of the present invention to provide a lens apparatus and an image projection apparatus, which are capable of automatically adjusting zoom or focus easily in accordance with change in field curvature.

In order to achieve the above-mentioned object, according to one embodiment of the present invention, there is provided a lens apparatus, including: a first optical unit configured to change a field curvature amount of a projection optical system by shifting in an optical axis direction of the projection optical system; a second optical unit including a focus adjustment unit configured to move during focusing and a zoom adjustment unit configured to move during zooming, the second optical unit being configured to change projection magnification and a focus position of the projection optical system by shifting in the optical axis direction of the projection optical system; a first detection unit for detecting a position of the first optical unit; a memory configured to store change information regarding changes in projection magnification and focus position of the projection optical system through the shift of the first optical unit; and a control unit configured to control the second optical unit to shift so as to reduce the changes in projection magnification and focus position of the projection optical system at the same time, which is caused due to the shift of the first optical unit, when the field curvature amount of the projection optical system is changed, based on the position of the first optical unit detected by the first detection unit and the change information stored in the memory.

Further, according to one embodiment of the present invention, there is provided an image projection apparatus, including: an image display element; and the above-mentioned lens apparatus.

Further, according to another embodiment of the present invention, there is provided an image projection apparatus, to which a lens apparatus is mountable, the lens apparatus, including: a first optical unit configured to change a field curvature amount of a projection optical system by shifting in an optical axis direction of the projection optical system; a second optical unit configured to change projection magnification or a focus position of the projection optical system by shifting in the optical axis direction of the projection optical system; and a sensor configured to detect a position of the first optical unit, in which the image projection apparatus comprises: a memory configured to store change information regarding change in projection magnification or focus position of the projection optical system through the shift of the first optical unit; and a control unit configured to control the second optical unit to shift so as to reduce the change in projection magnification or focus position of the projection optical system, which is caused due to the shift of the first optical unit, based on the position of the first optical unit detected by the sensor and the change information stored in the memory.

Further features of the present invention will become apparent from the following description of exemplary embodiments with reference to the attached drawings.

BRIEF DESCRIPTION OF THE DRAWINGS

FIG. 6 is a flowchart for illustrating control in a first embodiment of the present invention.

DESCRIPTION OF THE EMBODIMENTS

Now, detailed description is made of exemplary embodiments of the present invention with reference to the attached drawings.

First Embodiment (Image Projection Apparatus)

Figure 4:
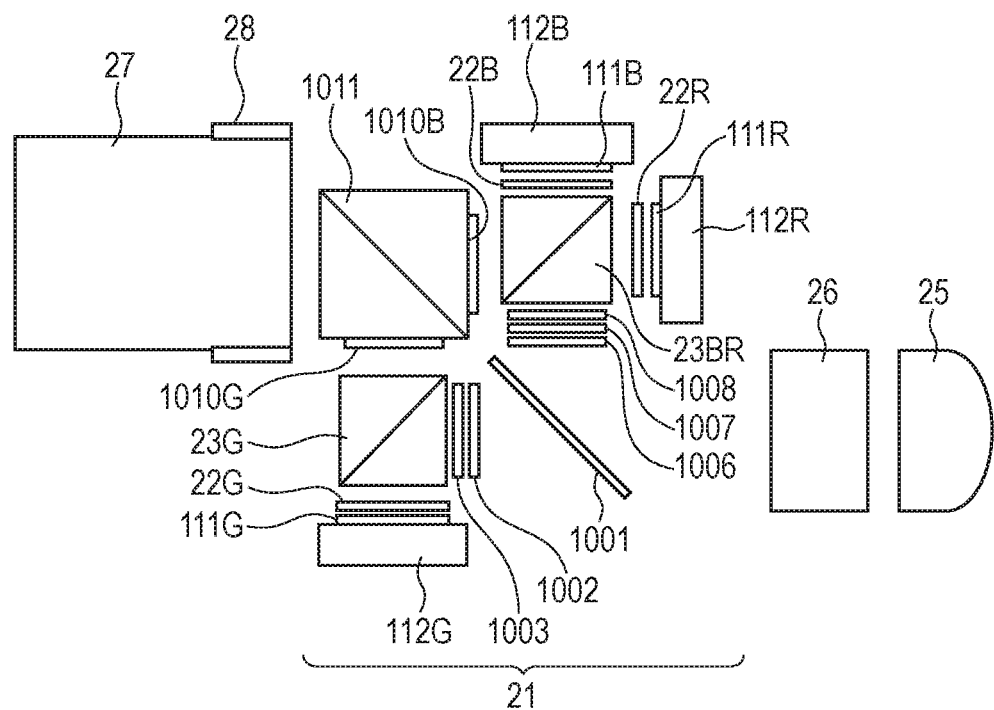
FIG. 4 is a schematic view for illustrating an optical configuration of a projector as the image projection apparatus according to the embodiments of the present invention.

FIG. 4 is a schematic view for illustrating an optical configuration of a projector as an image projection apparatus, to which a lens apparatus according to embodiments of the present invention is mounted. A light source portion 25 is a high-intensity light source such as an ultra-high pressure mercury lamp, and includes a luminous tube and a reflector. The luminous tube is configured to emit white light with a continuous spectrum. The reflector is configured to collect light in a predetermined direction. The light source portion 25 irradiates an illumination optical system 26 in the next step with light. The illumination optical system 26 includes a glass member such as a cylinder array. With an optical action of the glass member, there is formed a rectangular uniform illuminating area where a rectangular image is superimposed with a plurality of light fluxes. The illumination optical system 26 irradiates an optical unit 21, which is a color separating and composing optical system in the next step, with light.

The optical unit 21 includes a dichroic mirror 1001, which is configured to reflect a light beam in a wavelength region of blue (B) and red (R), and to transmit a light beam in a wavelength region of green (G). With respect to the light beam in the wavelength region of green (G), there are provided a half wavelength plate 1002, an incident-side polarizing plate 1003 for G, and a first polarization beam splitter 23G. The incident-side polarizing plate 1003 for G, which is configured to transmit only the S-polarized light and is obtained by bonding a polarization element to a transparent substrate. The first polarization beam splitter 23G has a polarization separation surface, and is configured to transmit P-polarized light and reflect the S-polarized light.

The S-polarized light, which is reflected by the first polarization beam splitter 23G serving as a prism configured to branch an optical path, is formed into circularly polarized light through intermediation of a quarter wavelength plate 22G for green. The S-polarized light travels toward a light bulb 111G, which serves as an image display element for green and is placed on a heat sink 112G. The quarter wavelength plate 22G is provided in the optical path between the first polarization beam splitter 23G and the light bulb 111G for green.

The light reflected by the light bulb 111G for green is converted into the P-polarized light through intermediation of the quarter wavelength plate 22G for green. Then, the light passes through the first polarization beam splitter 23G and an exiting-side polarizing plate 1010G for G configured to transmit only the P-polarized light, and travels toward a dichroic prism 1011 configured to transmit light beams R and B and to reflect a light beam G.

With respect to the light beams R and B reflected by the dichroic mirror 1001, there are provided an incident-side polarizing plate 1006 for the light beams R and B, which is configured to transmit only the P-polarized light and is obtained by bonding the polarization element to the transparent substrate, and a color selective phase difference plate 1007. The color selective phase difference plate 1007 has a function to convert a polarization direction of the light beam R by 90 degrees, and not to convert a polarization direction of the light beam B. Thus, the light beam in the wavelength region of red (R) is converted into the S-polarized light, and the light beam in the wavelength region of blue (B) passes while remaining the P-polarized light. In the optical path after passing through the color selective phase difference plate 1007, there is provided a trimming filter 1008, which is configured to return orange light to a lamp so as to increase a chromatic purity of the light beam R.

With a second polarization beam splitter 23BR, which serves as a prism configured to transmit the P-polarized light and reflect the S-polarized light, and to branch or synthesize the optical path, the light beam R being the S-polarized light is reflected, whereas the light beam B being the P-polarized light is transmitted. The light beam R reflected by the second polarization beam splitter 23BR is formed into the circularly polarized light through intermediation of a quarter wavelength plate 22R for red. Then, the light travels toward a light bulb 111R for red, which is placed on a heat sink 112R. The light reflected by the light bulb 111R for red is converted into the P-polarized light through intermediation of the quarter wavelength plate 22R for red.

Then, the light passes through the second polarization beam splitter 23BR, an exiting-side polarizing plate (polarization element) 1010B for B configured to rectify only the S-polarized light of B, and the dichroic prism 1011. After that, the light enters a projection lens 27 serving as a projection optical system.

Meanwhile, the light beam B, which passes through the second polarization beam splitter 23BR, is formed into the circularly polarized light through intermediation of a quarter wavelength plate 22B for blue. Then, the light travels toward a light bulb 111B for blue, which is placed on a heat sink 112B. The light reflected by the light bulb 111B for blue is converted into the P-polarized light through intermediation of the quarter wavelength plate 12B for blue. Then, the light is reflected by the second polarization beam splitter 23BR, and passes through the exiting-side polarizing plate (polarization element) 1010B for B configured to rectify only the S-polarized light of B, and the dichroic prism 1011. After that, the light enters the projection lens 27 serving as the projection optical system.

The light bulb 111R for red, the light bulb 111G for green, and the light bulb 111B for blue, which are reflective liquid crystal display elements, are configured to reflect the incident light and perform the image modulation. Further, through use of the above-mentioned color separating and synthesizing optical system, the image in the light bulbs 111R, 111G, 111B is projected on a projected surface (screen surface) as a color image by the projection lens 27. The reference symbol 28 denotes a lens shift unit for shifting the projection lens 27 to a direction orthogonal to an optical axis.

(Lens Apparatus)

Figure 5:
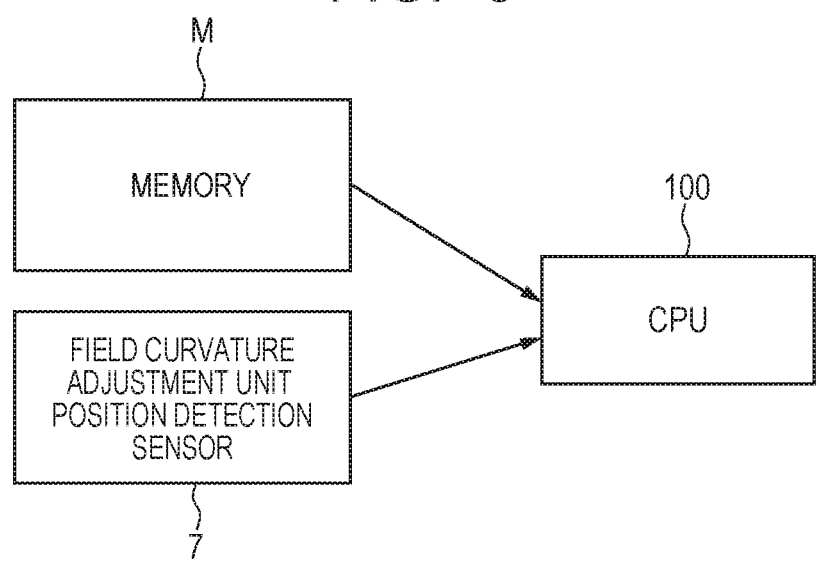
FIG. 5 is an explanatory view for illustrating a control unit configured to control projection magnification or change in focus position of the projection optical system to be reduced, based on information stored in a memory and information detected by a sensor.

Now, detailed description is made of a lens apparatus according to the first embodiment of the present invention with reference to FIG. 1A to FIG. 3C. The lens apparatus according to the first embodiment of the present invention includes the projection optical system 27 illustrated in FIG. 1A, FIG. 1B, FIG. 2A, and FIG. 2B, a sensor 7 described later, a memory M serving as memory means, and a CPU 100 serving as a control unit, which are illustrated in FIG. 5. Further, the projection optical system 27 includes a field curvature adjustment unit 1. The field curvature adjustment unit 1 is a first optical unit, which is configured to change a field curvature amount of the projection optical system by shifting in an optical axis direction of the projection optical system. Further, the projection optical system 27 includes a zoom adjustment unit 3 or a focus adjustment unit 2 serving as a second optical unit, which is configured to change projection magnification or a focus position of the projection optical system by shifting in the optical axis direction of the projection optical system.

Figure 1A:
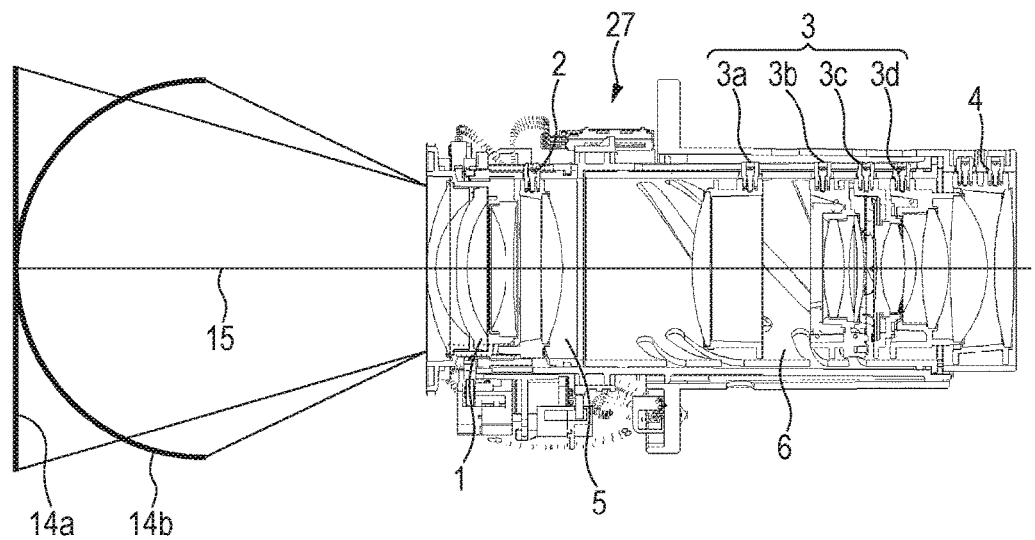
FIG. 1A is an explanatory view for illustrating image projection by an image projection apparatus, to which a lens apparatus according to embodiments of the present invention is mounted.
Figure 1B:
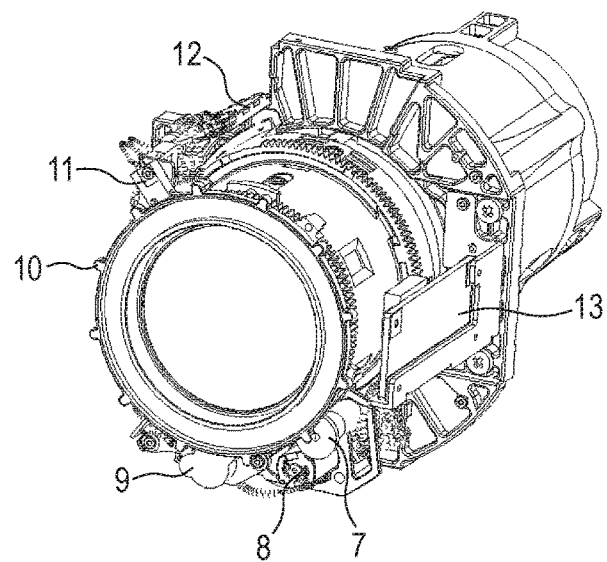
FIG. 1B is an explanatory view for illustrating the image projection by the image projection apparatus, to which the lens apparatus according to the embodiments of the present invention is mounted.
Figure 2A:
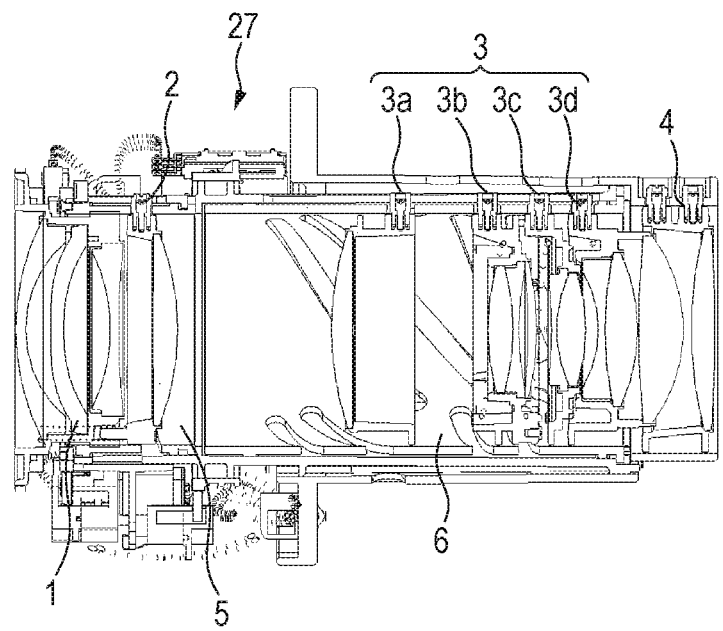
FIG. 2A is an explanatory view for illustrating a lens apparatus, in which a projection optical system according to the embodiments of the present invention is provided.
Figure 2B:
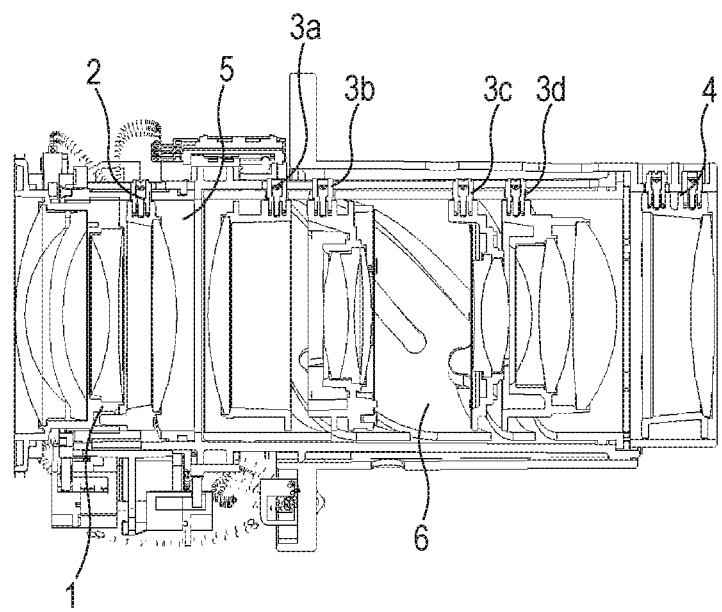
FIG. 2B is an explanatory view for illustrating the lens apparatus, in which the projection optical system according to the embodiments of the present invention is provided.

FIG. 1A, FIG. 2A, and FIG. 2B are sectional views for illustrating the projection optical system including a lens capable of adjusting (changing) the field curvature. FIG. 1B, FIG. 3A, FIG. 3B, and FIG. 3C are views for illustrating the outer appearance structure.

The field curvature adjustment unit 1, which is constructed by an optical component unit (lens unit), can select a degree of the field curvature (field curvature amount) of a projection image plane (screen surface) 14 as a flat shape 14a or a spherical shape 14b by moving (shifting) in an optical axis 15 direction of the projection optical system 27. In other words, through shifting of the field curvature adjustment unit 1, the projection image plane can be changed from one of the spherical shape 14b and the flat shape 14a to another shape. The field curvature adjustment unit 1 can move (shift) in the optical axis 15 direction by manually rotating a grip for field curvature adjustment (a moving unit) as illustrated in FIG. 1B, to thereby change the field curvature through the shifting in the optical axis 15 direction. The field curvature adjustment unit 1 includes a lens provided on most enlargement conjugate side among a plurality of lenses included in the projection optical system 27. It is preferred that the field curvature adjustment unit 1 have such a configuration because the field curvature can actively be changed with a simple configuration. As a matter of course, the field curvature adjustment unit 1 may be provided to the foremost side and constructed by only one lens.

Figure 3A:
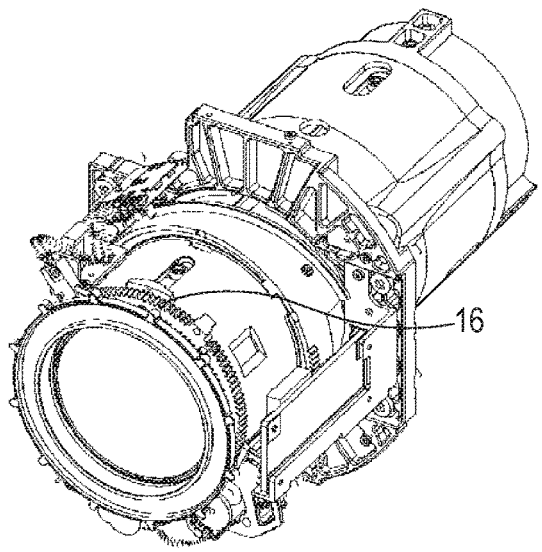
FIG. 3A is a view for illustrating drive for focusing, drive for zooming, and drive for field curvature.
Figure 3B:
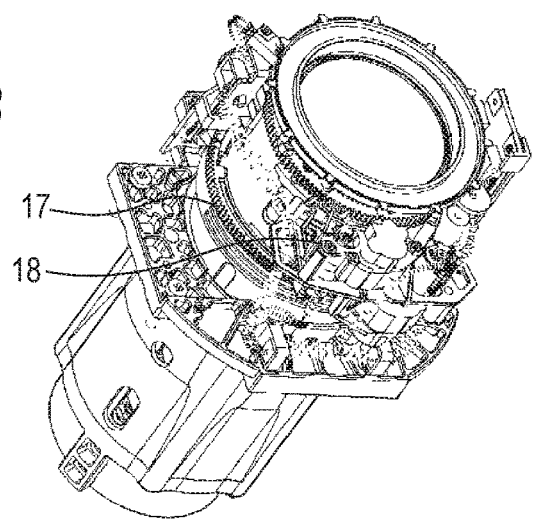
FIG. 3B is a view for illustrating the drive for focusing, the drive for zooming, and the drive for field curvature.
Figure 3C:
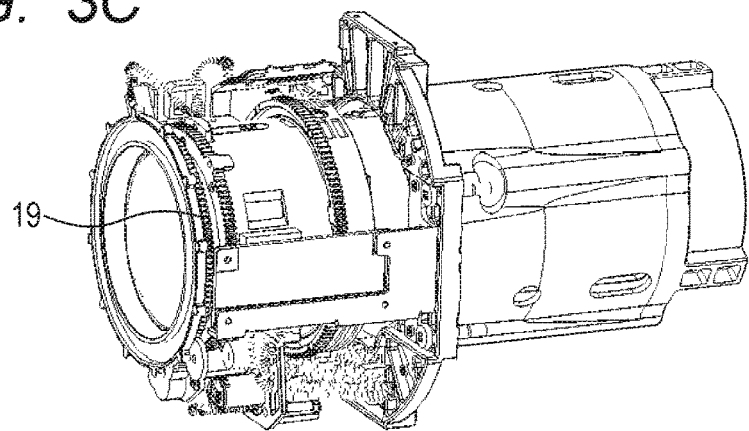
FIG. 3C is a view for illustrating the drive for focusing, the drive for zooming, and the drive for field curvature.

Then, through intermediation of a field curvature adjustment unit position detection gear 19, which is illustrated in FIG. 3C and integrally provided with the field curvature adjustment unit 1, a field curvature adjustment unit position detection sensor 7 illustrated in FIG. 1B as a first detection unit is rotated. The position of the field curvature adjustment unit 1 can be detected by the field curvature adjustment unit position detection sensor 7. In this manner, when the projection image plane 14 is changed from 14a to 14b, the projection image plane 14 can fit to the spherical screen.

A driving force generated by a zoom adjustment motor 8 illustrated in FIG. 1B is transmitted to a zoom adjustment cam ring 6 illustrated in FIG. 1A through intermediation of a zoom driving gear 17 illustrated in FIG. 3B so that the zoom adjustment unit 3 being the lens unit is moved in the optical axis 15 direction to change the projection magnification. The position of the zoom adjustment unit 3 can be detected by an end detection sensor 12 for the zoom adjustment position detection illustrated in FIG. 1B serving as a second detection unit. FIG. 2A is a view for illustrating a case where the zoom position is WIDE, and FIG. 2B is a view for illustrating a case where the zoom position is TELE.

Further, a driving force generated by a focus adjustment motor 9 illustrated in FIG. 1B is transmitted to a focus adjustment cam ring 5 illustrated in FIG. 2A through intermediation of a focus driving gear 16 illustrated in FIG. 3A so that the focus adjustment unit 2 being the lens unit is moved in the optical axis 15 direction to change the focus position. The position of the focus adjustment unit 2 can be detected by detecting an initial position by an end detection sensor 11 for the focus adjustment position detection, and detecting a movement amount from the initial position through detection of the number of rotations by a rotation detection sensor 18 for the focus adjustment unit position detection being a photo interrupter. In the first embodiment, only the focus adjustment unit 2 is moved in focusing, and the field curvature adjustment unit 1 is not moved for focusing. However, as a matter of course, other configurations may be adopted.

A fixed unit 4 illustrated in FIG. 1A is an immovable lens unit.

When the field curvature adjustment unit 1 having a refractive index different from that of the air is moved in the optical axis 15 direction, enlargement magnification of a projection image is varied. Thus, at the same time as the field curvature is intentionally generated, the enlargement magnification is also varied.

Thus, the movement amount of the field curvature adjustment unit 1 and the variation amount of the enlargement magnification as change information with respect to the movement amount are stored in the memory M, which is illustrated in FIG. 5 and provided on a lens control board 13, as memory information in advance. Then, when the field curvature adjustment unit 1 is moved in the optical axis 15 direction, the CPU 100, which serves as the control unit and is illustrated in FIG. 5, detects the movement amount from the field curvature adjustment unit position detection sensor 7, and performs the following control based on the memory information (variation information of enlargement magnification) stored in advance. Specifically, the zoom adjustment unit 3 is moved (shifted) so as to reduce (cancel) the variation of the enlargement magnification. In this manner, the variation of the enlargement magnification, which is caused at the same time as the adjustment of the field curvature, can automatically be adjusted. FIG. 6 is a flowchart for illustrating the above-mentioned control. As described above, through control of the CPU 100 in accordance with the flowchart illustrated in FIG. 6, it is possible to automatically suppress the change in enlargement magnification (field angle) caused due to the field curvature adjustment.

Second Embodiment

Now, description is made of a second embodiment of the present invention. When the field curvature adjustment unit 1 having the refractive index different from that of the air is moved in the optical axis 15 direction, the focus position of the projection image is varied. Therefore, at the same time as the field curvature is intentionally generated, the focus position is also varied.

Thus, in the second embodiment, the movement amount of the field curvature adjustment unit 1 and the variation amount of the focus position with respect to the movement amount are stored in the memory M, which is illustrated in FIG. 5 and provided on the lens control board 13, as the memory information in advance. Then, when the field curvature adjustment unit 1 is moved (shifted) in the optical axis 15 direction, the CPU 100, which serves as the control unit and is illustrated in FIG. 5, detects the movement amount from the field curvature adjustment unit position detection sensor 7, and performs the following control based on the memory information (variation information of focus position) stored in advance. Specifically, the focus adjustment unit 2 is moved (shifted) so as to reduce (cancel) the variation of the focus position.

In this manner, the variation of the focus position, which is caused at the same time as the adjustment of the field curvature, can automatically be adjusted. In other words, even when the field curvature is actively generated, for example, the focus position near the center of the projection image plane can be prevented from changing through the above-mentioned control.

MODIFICATION EXAMPLES

The exemplary embodiments of the present invention are described above, but the present invention is not limited to the first and second embodiments and can be modified and changed variously within the scope of the gist thereof. Incidentally, the function, shape, and relative arrangement of the components described in the first and second embodiment do not limit the scope of the invention as long as there is no particular description.

Modification Example 1

In the above-mentioned embodiments, the variation of the enlargement magnification or the variation of the focus position is automatically adjusted during the adjustment of the field curvature. However, the variation of the enlargement magnification and the variation of the focus position both may be automatically adjusted at the same time. Further, not only the variation of the enlargement magnification and the variation of the focus position but also the position of the lens shift, the focus position, and the zoom position can automatically be adjusted. In this case, the above-mentioned memory M further stores the positional relationship between the optical axis of the field curvature adjustment unit 1 and the optical axis of the projection optical system 27. During the field curvature adjustment, the CPU 100 may control the lens shift unit 28 based on the positional relationship. More specifically, the position of the field curvature adjustment unit 1, and the shift amount and the shift direction (shift deviation information) between the optical axis of the field curvature adjustment unit 1 and the optical axis of the projection optical system 27 at the position of the field curvature adjustment unit 1 are stored in the memory M. Further, the shift deviation may be canceled by the lens shift unit 28 based on the shift deviation information stored in the memory M along with the adjustment of the field curvature. With such a configuration, an impact, which is caused by, for example, a backlash between a cam follower and a cam groove, can be suppressed.

Modification Example 2

In the above-mentioned embodiments, the information stored in advance is the enlargement magnification variation or the focus position variation with respect to the movement amount of the field curvature adjustment unit 1. However, the adjustment amount of the zoom adjustment unit 3 or the adjustment amount of the focus adjustment unit 2 may directly be stored. In this case, there is no need to calculate the adjustment amount in the CPU 100 serving as the control unit.

Modification Example 3

In the above-mentioned embodiments, the CPU 100 shifts the second optical units 2 and 3 so as to reduce the projection magnification of the projection optical system or the change in focus position based on the position of the first optical unit 1 detected by the sensor 7 and the change information stored in the memory M. Here, the second sensor 12 or 18, which is configured to detect the position of the second optical unit, is provided. The CPU 100 may perform control as in the following manner based on the position of the first and second optical units detected by the sensor 7, 12, or 18 and the change information stored in the memory M. That is, the second optical units and 3 may be shifted so as to reduce the projection magnification of the projection optical system or the change in focus position.

Modification Example 4

In the above-mentioned embodiments, it is described that the lens apparatus includes the field curvature adjustment unit 1 serving as the first optical unit, the zoom adjustment unit 3 or the focus adjustment unit 2 serving as the second optical unit, the sensor 7, the memory M, and the CPU 100, but the configuration is not limited thereto. There may be adopted a configuration in which the lens apparatus, which includes the field curvature adjustment unit 1 serving as the first and second optical unit, the zoom adjustment unit 3 or the focus adjustment unit 2, and the sensor 7, is mountable to an apparatus main body of the image projection apparatus, and in which the apparatus main body of the image projection apparatus includes the memory M and the CPU 100.

Modification Example 5

In the above-mentioned embodiments, the first and second optical units do not include the optical components overlapping with each other, but may include at least one optical component overlapping with each other.

Modification Example 6

In addition to the configuration in which the impact caused by the shift deviation is suppressed with the lens shift unit as in Modification Example 1 described above, there may be adopted a configuration to cancel the color deviation caused due to the adjustment of the field curvature by electrically correcting a liquid crystal panel. More specifically, pixel deviation of RGB may be corrected by electrically correcting the liquid crystal panel to align the pixel in a unit less than one pixel.

According to the present invention, zoom or focus can automatically and easily be adjusted in accordance with change in field curvature.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A lens apparatus, comprising:
    a first optical unit configured to change a field curvature amount of a projection optical system by shifting in an optical axis direction of the projection optical system;
    a second optical unit including a focus adjustment unit configured to move during focusing and a zoom adjustment unit configured to move during zooming, the second optical unit being configured to change projection magnification and a focus position of the projection optical system by shifting in the optical axis direction of the projection optical system;
    a first detection unit configured to detect a position of the first optical unit;
    a memory configured to store change information regarding changes in projection magnification and focus position of the projection optical system through the shift of the first optical unit; and
    a control unit configured to control the second optical unit to shift so as to reduce the changes in projection magnification and focus position of the projection optical system, which is caused due to the shift of the first optical unit, when the field curvature amount of the projection optical system is changed, based on the position of the first optical unit detected by the first detection unit and the change information stored in the memory.

2. A lens apparatus according to claim 1, further comprising a second detection unit for detecting a position of the second optical unit,
    wherein the control unit controls the second optical unit to shift so as to reduce the changes in projection magnification and focus position of the projection optical system at the same time, which is caused due to the shift of the first optical unit, when the field curvature amount of the projection optical system is changed, based on the position of the first optical unit detected by the first detection unit, the position of the second optical unit detected by the second detection unit, and the change information stored in the memory.

3. A lens apparatus according to claim 1, wherein a projection plane of the projection optical system is capable of being changed from one of a spherical shape and a flat shape to another of the spherical shape and the flat shape through the shift of the first optical unit.

4. A lens apparatus according to claim 1, wherein the first optical unit and the second optical unit are prevented from having overlapping optical components with each other.

5. A lens apparatus according to claim 4, wherein the first optical unit does not move for focusing whereas moves during adjustment of the field curvature.

6. A lens apparatus according to claim 1, wherein the first optical unit and the second optical unit comprise at least one optical component overlapping with each other.

7. A lens apparatus according to claim 1, further comprising a moving unit for moving the first optical unit in the optical axis direction of the projection optical system, the moving unit being operable by a user.

8. A lens apparatus according to claim 1, further comprising a plurality of lenses,
    wherein the first optical unit comprises a lens positioned on most enlargement conjugate side among the plurality of lenses.

9. A lens apparatus according to claim 1,
    wherein the memory further stores a positional relationship between an optical axis of the first optical unit and an optical axis of the projection optical system, and
    wherein the control unit controls at least the first optical unit to shift in a direction orthogonal to the optical axis direction based on the positional relationship.

10. A lens apparatus according to claim 1, wherein the control unit is configured to control the second optical unit to shift so as to reduce the changes in projection magnification and focus position of the projection optical system at the same time.

11. An image projection apparatus, comprising:
    an image display element;
    a first optical unit configured to change a field curvature amount of a projection optical system by shifting in an optical axis direction of the projection optical system;
    a second optical unit including a focus adjustment unit configured to move during focusing and a zoom adjustment unit configured to move during zooming, the second optical unit being configured to change projection magnification and a focus position of the projection optical system by shifting in the optical axis direction of the projection optical system;
    a first detection unit configured to detect a position of the first optical unit;
    a memory configured to store change information regarding changes in projection magnification and focus position of the projection optical system through the shift of the first optical unit; and
    a control unit configured to control the second optical unit to shift so as to reduce the changes in projection magnification and focus position of the projection optical system, which is caused due to the shift of the first optical unit, when the field curvature amount of the projection optical system is changed, based on the position of the first optical unit detected by the first detection unit and the change information stored in the memory.

12. An image projection apparatus according to claim 11, wherein the control unit is configured to control the second optical unit to shift so as to reduce the changes in projection magnification and focus position of the projection optical system at the same time.

13. An image projection apparatus, to which a lens apparatus is mountable, the lens apparatus comprising:
    a first optical unit configured to change a field curvature amount of a projection optical system by shifting in an optical axis direction of the projection optical system;
    a second optical unit including a focus adjustment unit configured to move during focusing and a zoom adjustment unit configured to move during zooming, the second optical unit being configured to change projection magnification and a focus position of the projection optical system by shifting in the optical axis direction of the projection optical system; and
    a first detection unit configured to detect a position of the first optical unit wherein the image projection apparatus comprises:
- a memory configured to store change information regarding changes in projection magnification and focus position of the projection optical system through the shift of the first optical unit; and
- a control unit configured to control the second optical unit to shift so as to reduce the changes in projection magnification and focus position of the projection optical system, which is caused due to the shift of the first optical unit, when the field curvature amount of the projection optical system is changed, based on the position of the first optical unit detected by the first detection unit and the change information stored in the memory.

14. An image projection apparatus according to claim 13, wherein a projection plane of the projection optical system is capable of being changed from one of a spherical shape and a flat shape to another of the spherical shape and the flat shape through the shift of the first optical unit.

15. An image projection apparatus according to claim 13, further comprising a lens shift unit capable of moving the lens apparatus in a direction orthogonal to the optical axis direction,
- wherein the memory further stores a positional relationship between an optical axis of the first optical unit and an optical axis of the projection optical system, and
- wherein the control unit controls the lens shift unit based on the positional relationship.

16. An image projection apparatus according to claim 13, wherein the control unit is configured to control the second optical unit to shift so as to reduce the changes in projection magnification and focus position of the projection optical system at the same time.

* * * * *